July 16, 1940.  J. C. DIXON  2,207,786

FEED MECHANISM FOR PROFILING MACHINES

Filed Dec. 17, 1938   2 Sheets-Sheet 1

INVENTOR.
J. C. Dixon
BY Joseph H. Schofield
ATTORNEY

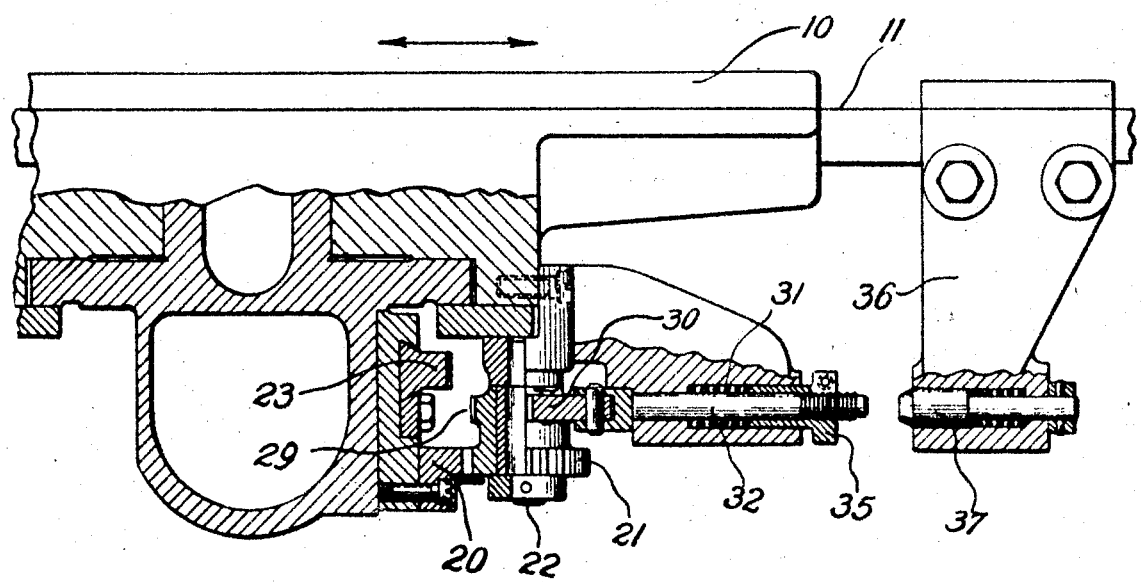
*Fig. 2*
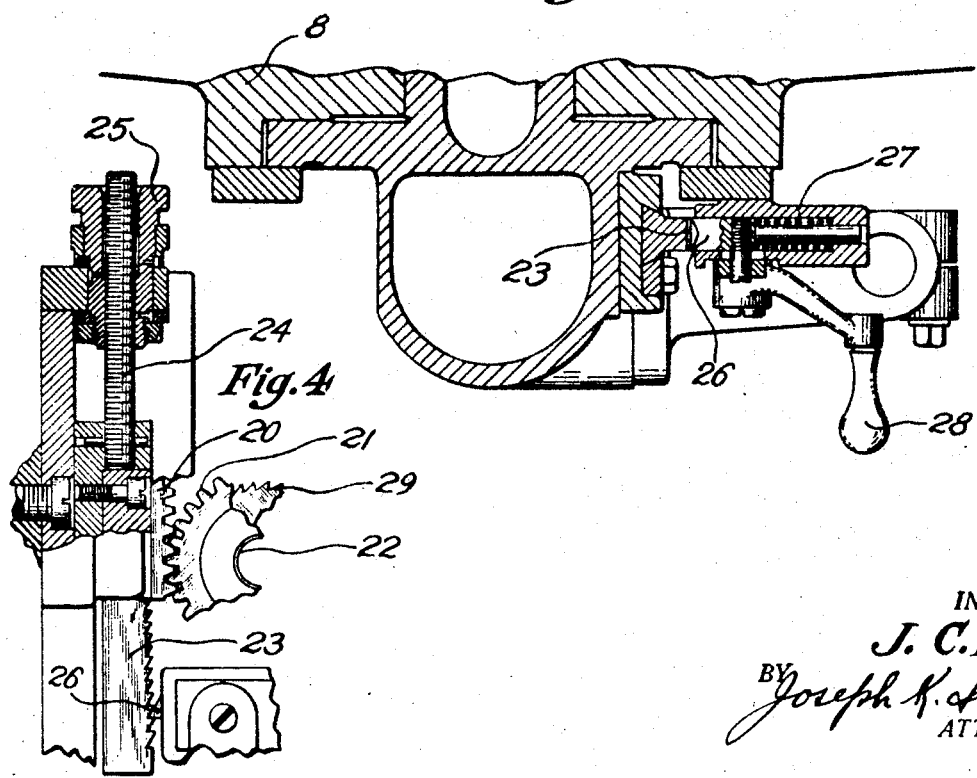
*Fig. 3*
*Fig. 4*
INVENTOR.
J. C. Dixon
BY Joseph K. Schofield
ATTORNEY Patented July 16, 1940

2,207,786

UNITED STATES PATENT OFFICE 2,207,786

FEED MECHANISM FOR PROFILING MACHINES

John C. Dixon, Hartford, Conn., assignor to Niles-Bement-Pond Company, Hartford, Conn., a corporation of New Jersey Application December 17, 1938, Serial No. 246,272

3 Claims. (Cl. 90—13.2)

This invention relates to a hand operated profiling machine, and more particularly to a mechanism for downwardly feeding the cutter head and cutter a predetermined distance upon completion of movement of the cutter about the outline being profiled.

An object of the invention is to provide self-actuating downward feeding means for the cutter head and cutter of a profiling machine adapted to be actuated whenever the cutter carriage is moved horizontally and laterally to or beyond a predetermined position.

One feature that enables me to accomplish the above named object is that a ratchet wheel is mounted upon a shaft carrying a gear meshing with a vertical rack on the cutter head, there being a spring mounted pawl on the frame of the machine adapted to engage and advance the ratchet wheel when the cutter carriage is moved laterally to an extreme position, a locking plunger on the carriage serving to prevent upward movement of the cutter head during operation.

With the above and other objects in view, the invention may include the features of construction and operation set forth in the following specification and illustrated in the accompanying drawings.

In the accompanying drawings annexed hereto and forming a part of this specification, I have shown the invention embodied in a single spindle horizontally movable cutter head and table type of profiling machine. It will be understood, however, that the invention can be otherwise embodied and that the drawings are not to be construed as defining or limiting the scope of the invention, the claims appended to this specification being relied upon for that purpose.

In the drawings:

Fig. 2 is a horizontal sectional view taken upon the planes of broken line 2—2 in Fig. 1.

Fig. 3 is a horizontal sectional view taken on the plane of line 3—3 in Fig. 1, and Fig. 4 is a fragmentary front elevation, partly in section, showing in detail the construction of the cutter head feeding rack and actuating notched bar for the cutter head.

Figure 1:
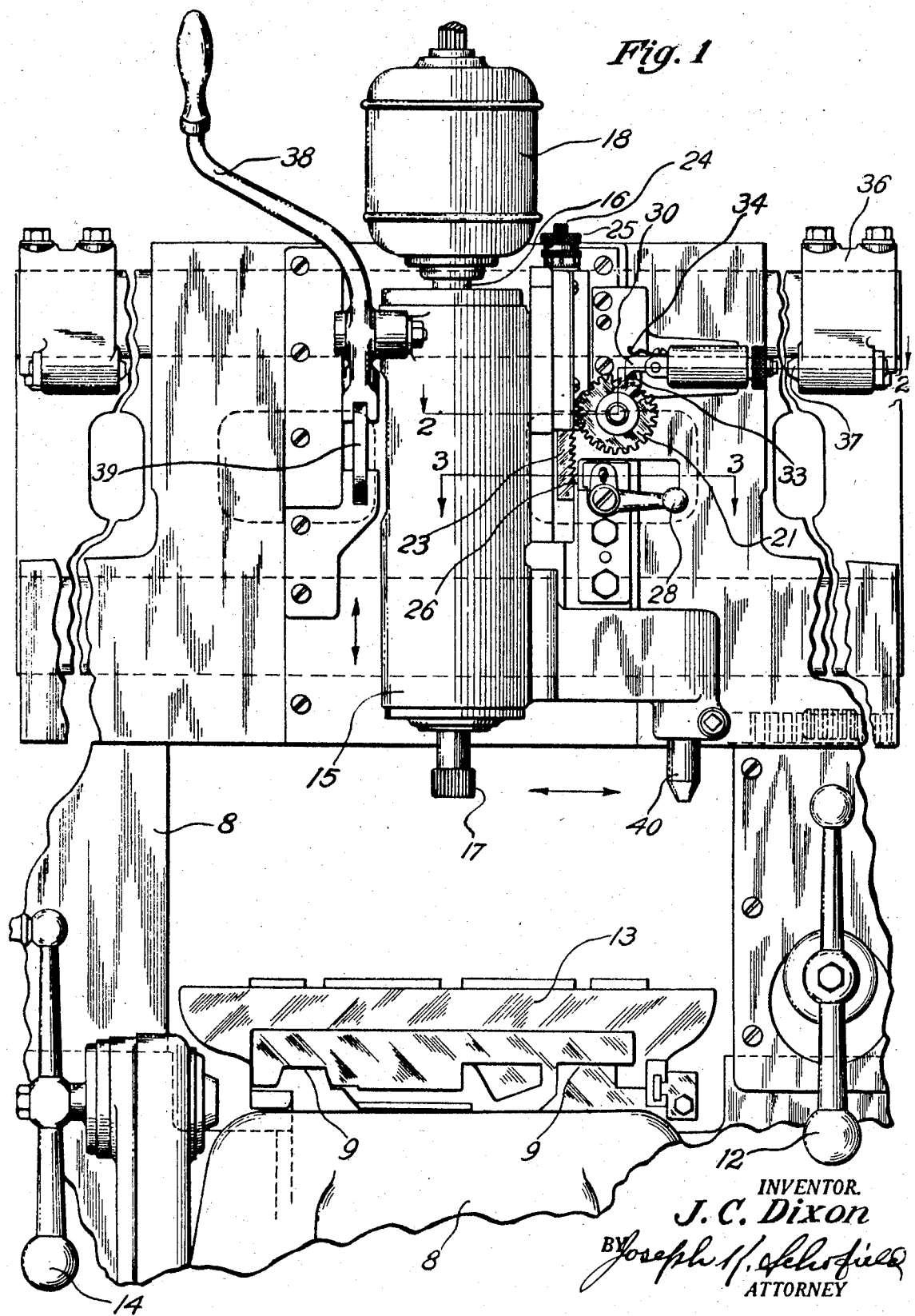
Figure 1 is a front elevation of the principal operative parts of a single spindle profiling machine having the present invention embodied therein.

In the above-mentioned drawings there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a horizontally movable carriage slidable laterally on a fixed member forming a portion of the frame of a profiling machine; second, a cutter head having a rotatable cutter carrying spindle therein, the head being movable vertically within the carriage; third, a vertical feeding rack mounted on one side of the cutter head and meshing with a gear on a shaft within the carriage laterally disposed relatively to the cutter head; fourth, a ratchet wheel forming a part of or secured to the gear; fifth, a vertical locking rack for the head mounted adjacent and parallel to the feeding rack; sixth, a locking plunger engaging the feeding rack; seventh, a spring mounted pawl adapted to engage the ratchet wheel; and eighth, an abutment on a fixed portion of the machine to advance the pawl a limited distance and rotate the ratchet wheel when the cutter carriage is moved laterally beyond a predetermined position.

Referring more in detail to the figures of the drawings, there is shown a conventional or standard form of profiling machine having a horizontally movable tool supporting carriage 10 adapted to be reciprocated along ways 11 formed on a part of the machine frame. These reciprocatory movements may be effected through appropriate mechanism by means of a hand lever 12. Mounted on horizontal ways 9 on the frame below the carriage 10 is a work supporting carriage 13 movable laterally along ways on the frame by rotation of a hand lever 14. As these parts and the mechanism for moving them form no part of the present invention, it is not thought that further description of the table 13 and the cutter carriage 10 will be required. The work table 13, it will be understood, is reciprocated in a horizontal plane in one direction and the cutter carriage 10 is reciprocated in another horizontal plane above the plane of the table in a direction at right angles to the direction of movement of the table 13. These movements of the carriage 10 and table 13 to effect the profiling operations require the operator to constantly manipulate the handles 12 and 14. The present invention provides means to feed the cutter head 15 downward while the operator continues to operate the handles 12 and 14 and without stopping the cutting operation.

Mounted for vertical movement in the cutter carriage is the cutter head 15 within which is rotatably mounted a cutter spindle 16 on which may be mounted the cutter 17. The spindle 16 may be rotated by any appropriate means as by the electric motor 18 shown in Fig. 1. Mounted along one side of this cutter head 15 is a rack 20 suitably secured in fixed position on the head and adapted to mesh with a gear 21 rotatably mounted on a horizontal forwardly extending shaft 22 rotatably mounted in the carriage 10 laterally adjacent the cutter head. Rotation of this gear 21 will therefore move the cutter head 15 vertically up or down. Also mounted on the cutter head 15 is a locking rack 23 preferably mounted for vertical adjustment relative to the head 15 by means of a screw 24 extending through a rotatable nut 25 on the upper surface of the carriage 10. This locking rack 23 is adapted to be engaged by a locking plunger 26 mounted for lateral movement toward and from the rack 23, there being a spring 27 normally forcing this locking plunger 23 into engaging position with the rack to retain the head 15 against upward movement. A handle or lever 28 attached to the plunger 26 is provided for retracting the plunger 26 to permit upward movement of the cutter head 15.

Mounted on the shaft 22 for rotation with the gear 21 is a ratchet wheel 29 which may preferably be formed integrally with the gear. This ratchet wheel 29 is adapted to be engaged by a laterally movable pawl 30 mounted for horizontal movement in the carriage 10, there being a spring 31 normally forcing the pawl 30 to its retracted or non-contacting position. As shown in Fig. 2 the pawl 30 is pivotally mounted on a plunger 32 and held in its lower position against a stop 33 by a light leaf spring 34. The plunger 32 has threaded to it a nut 35 and within the recess for the plunger 32 and bearing against the nut is housed the spring 31.

Mounted adjacent the carriage 10 and on a fixed part of the machine is an abutment or bracket 36 adjustable to any desired lateral position. Upon movement of the carriage 10 laterally to the right as shown in Fig. 1, the pawl 30 will be forced to the left with its plunger 32 against the pressure of springs 31 and will rotate the ratchet wheel 29 one or more of its notches. As shown in Fig. 2 the nut 35 on plunger 32 has but limited movement which is sufficient to feed the cutter head 15 downward a predetermined distance. By varying the position of the nut 35 on the plunger 32 the distance moved by the plunger 32 and pawl 30 can be readily varied. Within the abutment 36 is a spring pressed head 37 so that further movement of the carriage to the right after contacting the plunger 32 will cause retraction of the head 37 within the abutment 36. The rotation of ratchet wheel 29 will also rotate the gear 21 and will thus force the cutter head 15 downward so that the locking pawl 26 will engage another tooth in the locking or indexing rack 23.

Preferably, the cutter head 15 is counterbalanced so that it will be normally forced toward its uppermost position. A hand lever 38 pivotally mounted on the portion of the cutter head 15 is attached to a link 39 engaging the fixed part of the machine so that the cutter head 15 may be manually moved downward at any time or moved upward when the locking pawl 26 is retracted.

In operation the two hand levers 12 and 14 are operated in the usual manner to move the table 13 toward and from the operator and to move the cutter carriage 10 laterally over the table 13 to cut any outline that may be desired, there being a pin 40 adapted to engage a model or template of the work piece being formed. With each movement of the cutter carriage 10 laterally toward the right to or beyond a predetermined position the end of the plunger 32 carrying the feeding pawl 30 strikes against the head 37 and causes rotation of the ratchet wheel 29 and gear 21 to force the cutter head 15 downwardly against the weight of the counterbalance. With each completion of an outline of a work piece by these means the cutter head 15 may be given a feeding movement downward of any desired amount depending upon the distance permitted to be moved by the index pawl 30.

What I claim is:

1. Feeding mechanism for a profiling machine cutter head comprising in combination a machine frame, a carriage supported for horizontal movement thereon, a cutter head movable vertically within said carriage, a rack on said head engaging a gear rotatably mounted in said carriage and engaging said rack, ratchet means to rotate said gear and move said head in one direction, means to operate said ratchet means when said carriage is moved to a predetermined position, a locking rack adjustably secured to said head, and a spring pressed plunger on said carriage engaging said last mentioned rack and retaining said head against upward movement.

2. Feeding mechanism for a profiling machine cutter head comprising in combination, a machine frame, a carriage supported for horizontal movement thereon, a cutter head movable vertically within said carriage, a rack on said head engaging a gear rotatably mounted in said carriage and engaging said rack, a ratchet wheel rotatable with said gear, a pawl engaging said ratchet wheel slidably mounted within said carriage, an abutment on said machine frame adapted when said carriage is moved to a predetermined position to move said pawl and advance said gear and rack to feed said cutter head downward, a locking rack adjustably secured to said head, and a spring pressed plunger on said carriage engaging said last mentioned rack and retaining said head against upward movement.

3. Feeding mechanism for a profiling machine cutter head comprising in combination, a machine frame, a carriage supported for horizontal movement thereon, a cutter head movable vertically within said carriage, a rack on said head engaging a gear rotatably mounted in said carriage and engaging said rack, a ratchet wheel rotatable with said gear, a pawl engaging said ratchet wheel and normally spring pressed in one direction within said carriage, a spring pressed abutment on said machine frame adapted when said carriage is moved to a predetermined position to move said pawl and advance said gear in a direction to feed said cutter head downward, a locking rack adjustably secured to said head, and a spring pressed plunger on said carriage engaging said last mentioned rack and retaining said head against upward movement.

JOHN C. DIXON.